UNITED STATES PATENT OFFICE 2,620,330

POLYMERIZATION OF STYRENE WITH CYCLIC SUCCINOYL PEROXIDE

Harold F. Park, East Longmeadow, Mass., assignor to Monsanto Chemical Company, St. Louis, Mo., a corporation of Delaware No Drawing. Application November 19, 1949, Serial No. 128,471

2 Claims. (Cl. 260—93.5)

One object of this invention is to provide a process for polymerization of styrene at temperatures above 100° C. to obtain moldable polymers. Still another object is to provide a catalyst for the polymerization of styrene at temperatures above 100° C.

These and other objects are attained by polymerizing styrene or a mixture of styrene with a monomeric material polymerizable therewith, said mixture containing a predominant proportion of styrene, at temperatures between 100° C. and 400° C. in contact with one or more cyclic organic or inorganic compounds which are thermally unstable at 100-400° C. and which decompose through rupture of one or more rings to give a diradical with two unpaired electrons.

The number of such cyclic organic or inorganic compounds is fairly limited due to the restriction that they must be thermally unstable at temperatures between 100° C. and 400° C. and which must then break down by ring rupture to yield a diradical. Among the operative catalysts are:

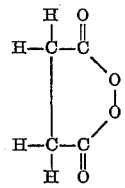
Cyclic succinyl peroxide

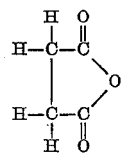
Succinic anhydride

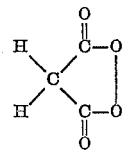
Cyclic malonyl peroxide

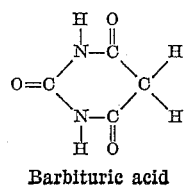
Barbituric acid

Cyclic barium peroxide

Cyclic beryllium peroxide

Diazomethane

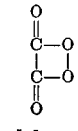
Oxalyl peroxide

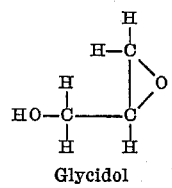
Glycidol

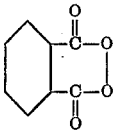
Cyclic phthaloyl peroxide

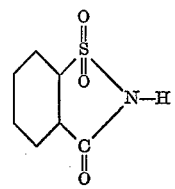
Saccharin

Cyclic succinyl peroxide may be prepared according to the process disclosed by Vanino and Thiele in Berichte 29, 1724 (1896). The process involves reacting succinyl chloride with sodium peroxide.

An examination of the above formulae shows that in spite of a wide variance in the number and type of atoms making up the molecule, each molecule contains a cyclic group which, on rupture, yields a diradical with two unpaired electrons.

The following examples are given in illustration and are not intended as limitations on the scope of this invention. Where parts are mentioned, they are parts by weight.

*Example I*

A mixture of 100 parts of pure monomeric styrene and 1.0 part of cyclic succinyl peroxide was placed in a stainless steel pipe capped at one end. The mixture was boiled for about 15 minutes at atmospheric pressure to remove dissolved oxygen. The mixture was then cooled in a nitrogen atmosphere and the other end of the stainless steel pipe was firmly capped so that both ends of the pipe were sealed. The sealed pipe was then placed in a molten tin bath at a temperature of 370° C. and kept in said bath at a temperature of 370° C. for 5 minutes. The pipe was then removed from the bath, cooled to room temperature and opened. A solid transparent rod of polystyrene was obtained which was thermoplastic and could be easily molded by the conventional injection or compression molding processes.

When the process of Example I was repeated, using no catalyst or benzoyl peroxide as a catalyst, the product was a friable weak polymer which could not be molded by the conventional molding methods.

It is sometimes advantageous to conduct the process of this invention in the presence of a reducing agent. Many such materials are known and have been used in polymerization reactions. The preferred reducing materials for this invention are metallic salts of alpha,beta-unsaturated acids since this class of compounds does not produce a color or haze in the polymer produced. Examples of such compounds are copper acrylate, nickel maleate, lead methacrylate, etc. Other reducing agents which may be used are quinones, organic sulfinates, aldehydes, amines, alcohols, thio-acids, mercaptans, ascorbic acid, and sulfur dioxide.

*Example II*

100 parts of styrene were placed in a heavy-walled Pyrex tube and 0.1 part of succinyl anhydride and .0001 part of copper acrylate were dissolved in the monomer. Dissolved and occluded oxygen were removed from the styrene by boiling the styrene under about 5 mm. of mercury pressure. The tube was then sealed without releasing the vacuum and the sealed tube was immersed in a molten Arochlor bath at 270° C. The tube was kept in the 270° C. bath for about 15 minutes and it was then cooled and broken to obtain a crystal-clear rod of polystyrene which had excellent strength, physical properties and could be easily molded by the conventional methods.

When Example II was repeated, using the same amount of copper acrylate, but no succinyl anhydride, a friable, non-moldable powder product was obtained.

*Example III*

100 parts of a solution of polystyrene in styrene monomer, in which the styrene monomer constituted 68% by weight of the total, were mixed with 0.015 part of saccharin and the mixture was passed contiuouly under a pressure of about 250 p. s. i. through a nickel pipe heated to about 285° C. The cross-section of the pipe, the length of the heated section of the pipe, and the pressure were so regulated that the polystyrene solution remained in the heated portion of the pipe for about 7 minutes. During the 7 minutes in the heated zone, the monomer polymerized and the continuous pressure forced it from the heated zone through the cooler end of the pipe. The polystyrene thus obtained could be molded and the articles made therefrom had excellent color, clarity and physical properties. The monomeric styrene content of the polymer was substantially zero.

*Example IV*

A solution of polystyrene in styrene monomer, in which solution the styrene monomer constituted 72% by weight, said solution containing 0.09 part of cyclic barium peroxide, was forced into a standard screw extruder under a pressure of 250 p. s. i. The barrel of the extruder was heated to 285° C. The polystyrene solution was then extruded at 285° C. at a rate of approximately 450 pounds per hour. The material obtained from the extrusion was completely polymerized and contained less than 2% of volatile or methanol-soluble material. The polymer thus obtained was crystal-clear, tough, hard and could be easily molded by conventional injection and compression molding processes.

*Example V*

A mixture of 70 parts of styrene, 30 parts of alpha-methyl styrene and 0.1 part of phthaloyl peroxide was placed in a stainless steel pipe capped at one end. The mixture was boiled for about 15 minutes at atmospheric pressure to remove dissolved oxygen. The mixture was then cooled in a nitrogen atmosphere and the other end of the stainless steel pipe was firmly capped so that both ends of the pipe were sealed. The sealed pipe was then placed in a molten tin bath at 370° C. and kept in said bath at a temperature of 370° C. for 5 minutes. The pipe was then removed from the bath, cooled to room temperature and opened. A solid transparent rod of a copolymer of styrene and alpha-methyl styrene was obtained which could be easily molded by conventional means.

The process of this invention may be carried out at temperatures between 100° C. and 400° C. It is preferable to carry out the invention in the absence of oxygen and other materials which are known to cause polymerization at temperatures below 100° C. The length of the polymerization cycle determines to some extent the molecular weight of the polymer produced. A short cycle from 10 to 15 minutes at 400° C. can be used to obtain polymers of relatively low molecular weight and a cycle as long as 30 minutes at 100° C. may be used to produce polymers of considerably higher molecular weight but still moldable in nature. In any event, the polymerization cycle need be no longer than 30 minutes compared with 18–30 hours necessary by previous processes.

The amount of catalyst used may vary between 0.01 part and 5 parts per 100 parts of styrene. At the lower part of the range, polymerization is slow unless the higher temperature range is used, and the molecular weight of the polymer is relatively high. At from 3–5 parts, polymerization is qute rapid even at 100° C. and the product is so low in molecular weight that it approaches the lower limit of moldability. In order to obtain the most accurate control of the reaction rate and to produce an optimum range of moldable polymers, the amount of catalyst is preferably restricted to from 0.01–1.0 part per 100 parts of styrene.

The reducing agent which is optional serves the purpose of activating the catalysts and increasing the reaction rate. It has little or no effect on the molecular weight of the polymer nor on the physical properties thereof. It should be used in quantities ranging from 0.1–15 parts per million parts of styrene.

Various methods and apparatus may be used for polymerising the styrene under the conditions of this invention. For example, it may be polymerized in sealed glass tubes or sealed metal tubes. The monomer or solution of polymer in the monomer may be forced through a heated metal tube or a heated glass tube, or a solution of a partial polymer in the monomer may be forced through a screw extruder, etc. The main precaution to be taken in any of the apparatus is the substantial exclusion of oxygen from the monomer.

In some cases, it may be desirable to polymerize a solution of a polymer of styrene in monomeric styrene. This method results in the use of a viscous liquid as a raw material, such a liquid being more easily handled in continuous operations. In such solutions the monomer preferably constitutes 60–80 weight percent of the solution.

The process of this invention is applicable to styrene and mixtures of styrene with vinylidene compounds in which mixtures the styrene constitutes the major proportion by weight. Among the compounds which may be polymerized with styrene in the process of this invention are alpha-alkyl styrenes such as alpha-methyl styrene; chlorostyrenes such as p-chlorostyrene, 2,5-dichlorostyrene, divinyl benzene, vinyl pyridine, vinyl quinolines; vinyl esters such as vinyl acetate, vinyl butyrate; acrylic and alpha-substituted acrylic acids and the esters, nitriles and amides thereof such as methyl acrylate, ethyl acrylate, acrylonitrile, acrylamide, methyl methacrylate, butyl methacrylate, methyl phenacrylate, methacrylonitrile, methacrylamide, etc.; alpha-beta-ethylenically unsaturated dicarboxylic acids and anhydrides and the esters and amides and nitriles thereof such as maleic acid, maleic anhydride, fumaric acid, fumaronitrile, etc.; dienes such as butadiene, isoprene, piperylene, etc.; vinyl halides, vinyl chloride, vinylidene chloride, etc.

This invention provides a simple process for preparing moldable polymers of styrene and copolymers of styrene, in which the styrene is a predominant part, by polymerizing the styrene monomer or monomer mixtures in a matter of minutes rather than a matter of hours or days as has been previously necessary. The process has the further advantage that the products contain substantially no volatile material, are easily moldable, and do not deteriorate upon ageing.

It is obvious that many variations may be made in the products and processes of this invention without departing from the spirit and scope thereof as defined in the appended claims.

What is claimed is:

1. A mass polymerization process which comprises polymerizing styrene at 370° C. for 5 minutes in contact with cyclic succinoyl peroxide.

2. A mass polymerization process which comprises polymerizing styrene at from 100–400° C. in from 5 to 30 minutes in contact with cyclic succinoyl peroxide.

HAROLD F. PARK.

REFERENCES CITED

The following references are of record in the file of this patent:

UNITED STATES PATENTS

| Number | Name | Date |
|---|---|---|
| 2,259,180 | Schoenfeld | Oct. 14, 1941 |
| 2,310,961 | Kropa | Feb. 16, 1943 |
| 2,376,014 | Semon | May 15, 1945 |
| 2,400,041 | Dickey | May 7, 1946 |
| 2,533,525 | Snyder | Dec. 12, 1950 |

FOREIGN PATENTS

| Number | Country | Date |
|---|---|---|
| 599,429 | Great Britain | Mar. 12, 1948 |